United States Patent [19]

Frisch et al.

[11] 4,302,553

[45] Nov. 24, 1981

[54] INTERPENETRATING POLYMERIC NETWORKS

[75] Inventors: Harry L. Frisch, 132 Mosher Rd., Delmar, N.Y. 12054; Kurt C. Frisch, 17986 Parke La., Grosse Ile, Mich. 48138; Daniel Klempner, 29340 Dequindre Rd., Apt. 204, Warren, Mich. 48221

[73] Assignees: Harry L. Frisch, Delmar, N.Y.; Kurt C. Frisch, Grosse Ile; Daniel Klempner, Warren, both of Mich.

[21] Appl. No.: 303,272

[22] Filed: Nov. 2, 1972

Related U.S. Application Data

[63] Continuation-in-part of Ser. No. 85,362, Oct. 30, 1970, abandoned.

[51] Int. Cl.$^3$ .................. C08L 33/08; C08L 75/12
[52] U.S. Cl. ................................ 525/28; 525/31; 525/100; 525/107; 525/127; 525/128; 525/129; 525/130; 525/438; 525/440; 525/453; 525/454; 525/455; 525/459; 525/903
[58] Field of Search .............. 260/824, 859 R, 830 P, 260/858; 525/28, 31, 100, 107, 127, 128, 129, 130, 438, 454, 459, 903

[56] References Cited

U.S. PATENT DOCUMENTS

| | | | |
|---|---|---|---|
| 3,316,324 | 4/1967 | Mendoyanis | 260/830S |
| 3,351,517 | 11/1967 | Willis | 260/889 |
| 3,657,379 | 4/1972 | Hilbelink et al. | 260/824 R |
| 3,700,752 | 10/1972 | Hutchinson | 260/859 R |

FOREIGN PATENT DOCUMENTS 728508 4/1955 United Kingdom .

OTHER PUBLICATIONS

Millar, *J. Chem. Soc.* (London), 1311–1317 (1960).
*The Vanderbilt Rubber Handbook*, Winspear, G. G., "Vulcanization" R. T. Vanderbilt Co. Inc., N. Y. (1958) pp. 366, 367, 372 & 373.

Primary Examiner—Wilbert J. Briggs, Sr.
Attorney, Agent, or Firm—Gordon W. Hueschen

[57] ABSTRACT

Synthetic resins having a topologically interpenetrating polymeric network comprise macrocyclic structures of chemically different, crosslinking polymers which are permanently entangled with each other. The several macrocyclic structures that are present are characterized by the absence of chemical bonds between the individual networks.

21 Claims, 3 Drawing Figures

INTERPENETRATING POLYMERIC NETWORKS

CROSS-REFERENCE TO RELATED APPLICATIONS

This application is a continuation-in-part of copending application Ser. No. 85,362 filed on Oct. 30, 1970 now abandoned.

BACKGROUND OF THE INVENTION

1. Field of the Invention

This invention relates to a composition composed of interpenetrating polymeric networks. More particularly, the interpenetrating polymeric networks of this invention are composed of at least two chemically different, crosslinking polymers which do not inter-react chemically.

2. Description of the Prior Art

Interpenetrating polymeric networks (hereinafter referred to as IPN) of chemically similar polymers such as the vinyl type polymers are known in the art. For example, Millar, J. Chem. Soc., 1311 (1960), discloses IPN's of styrene and divinylbenzene prepared by the imbibition of a styrene-divinylbenzene monomer solution into a conventional divinylbenzene-styrene resin and subsequent polymerization of the monomers. This is also taught by British Pat. No. 728,508 and U.S. Pat. No. 3,078,140 where preparation of ion exchange resins having IPN's is disclosed.

SUMMARY OF THE INVENTION

The IPN's of this invention are composed of chemically dissimilar crosslinking polymer chains which have substantially no chemical bonding therebetween. The existence of these compositions is surprising. The mixing of chemically different polymers in the solid state usually results in multiphase polyblends. Even the mixing of two different polymer solutions generally produces two liquid phases. It has been found, however, that this difficulty can be overcome, without resorting to chemically bonding the two or more networks, by producing an IPN. By crosslinking a polymer in the presence of a crosslinked network, an IPN can be produced composed of several separately cross-linked polymers held together by permanent chain entanglements.

Figure 1:
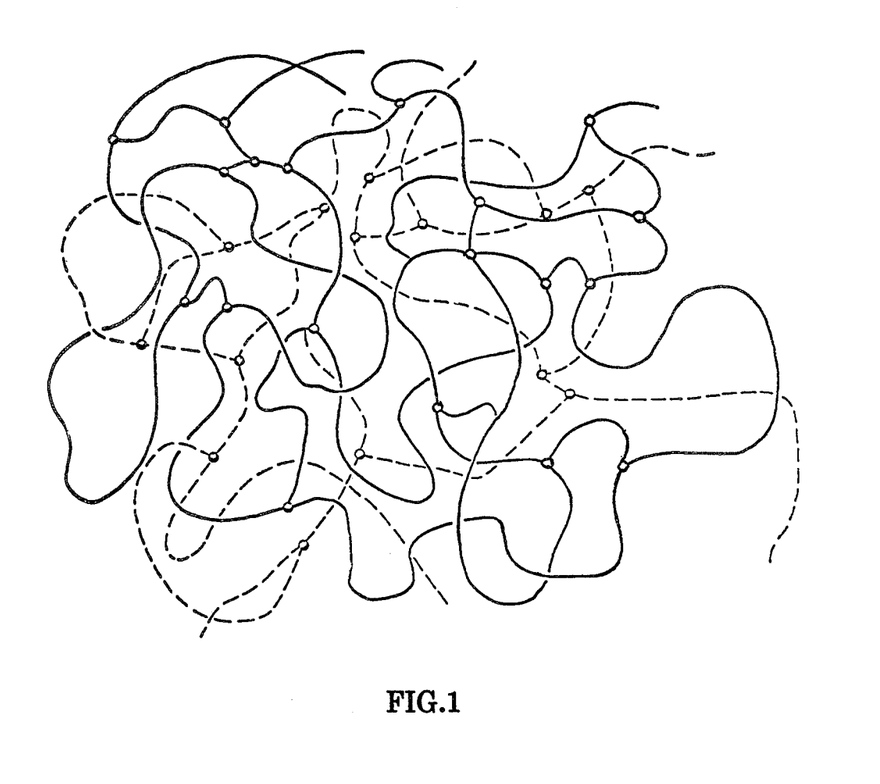
FIG. 1 is a schematic representation of a topologically interpenetrating polymeric network of this invention.

A crosslinked polymer can be thought of as a linear molecule containing macrocycles of various sizes along its chain. The crosslinking of another polymer in the presence of the first crosslinked polymer causes a statistical number of the macrocycles of the first crosslinked polymer to be threaded through by those of the second crosslinked polymer to form an IPN. The properties of such a network reflect those of the constituent polymers. The mechanical properties, such as tensile strength of the IPN, reflect those of the stronger network, while the swelling characteristics of the IPN approach those of the more readily swellable network. Thus, IPN's from the chemically dissimilar polymers are new and desirable materials which are not limited by chemical incompatibility. A schematic representation of an IPN of this invention comprised of two topologically interpenetrating macrocyclic structures is shown in FIG. 1 where one macrocyclic structure is represented by a solid line and the other by an interrupted line.

In accordance with this invention, IPN's are prepared from chemically dissimilar crosslinking polymers which do not inter-react chemically, i.e., which are crosslinkable by different mechanisms under the process conditions employed by means of polymer specific crosslinking agents. Polymer specific crosslinking agents are those crosslinking agents, which under the process conditions employed, act to crosslink one type of the dissimilar polymers but not the other. The polymers are intimately mixed, so as to avoid complete phase separation, in combinations of two or more where at least two of the crosslinking polymers are chemically dissimilar, together with their respective polymer specific crosslinking agents and stabilizers, and subsequently cured to form the IPN's. The crosslinking polymers employed in the IPN's of this invention typically can be polyfunctional polyurethanes, polyepoxides, polyesters, polyamides, polyimides, phenolics, polysiloxanes, polysulfides, acrylics, poly(styrenebutadiene), poly(styrene-acrylonitrile), poly(butadiene-acrylonitrile), polychloroprene, poly(chloroprene-acrylonitrile), poly(acrylonitrile-butadiene-styrene), combinations of the foregoing, and the like. The crosslink density of the foregoing crosslinking polymers must be such that the resulting macrocyclic rings have at least 20 ring atoms and preferably at least 50 ring atoms. The relative amounts of the chemically dissimilar crosslinking polymers that are present can vary over a wide range depending on the desired properties of the ultimate resin. For example, in an IPN made up of two macrocyclic structures, the relative amounts of each polymeric chain can be in a weight ratio as high as 9:1 and higher, or as low as 1:9 or lower.

The presence of ionizable groups on the polymer chains which make up the macrocyclic structures of the IPN are generally undesirable because of the possibility of ionizable salt formation between such ionizable groups if they are present on more than one macrocyclic structure. The presence of ionizable groups on only one macrocyclic structure is advantageous, however, when the IPN's are formulated as coatings to be applied by electrodeposition or if it is desired to enhance the low temperature properties of the present synthetic resins when formulated as elastomers. Particularly desirable for such purposes are pendant carboxyl groups on one of the intertwined or entangled macrocyclic structures of the resin.

In preparing an IPN, the polymers are chosen so that at least two of the polymers have different crosslinking mechanisms. In this manner, upon crosslinking, the polymer chains of one produced macrocyclic structure are threaded through, but have substantially no chemical bonding with, a macrocyclic structure produced by the other polymers which are present. Further proof of the existence of a single IPN rather than a completely phase-separated polyblend is provided by the fact that the IPN's of this invention exhibit a single glass transition temperature (Tg), intermediate in temperature to the Tg's of the constituent components, as measured by differential scanning colorimetry.

The IPN's of this invention are useful as resins for the preparation of films, elastomers, adhesives, coatings, and the like.

DESCRIPTION OF THE PREFERRED EMBODIMENTS

The IPN's of the present invention can be prepared by several methods. For example, emulsions or solutions of two types of chemically dissimilar polymers can be admixed, together with their respective crosslinking agents where necessary, and then simultaneously cured, i.e., crosslinked, thereby producing two entangled macrocyclic structures. Alternatively, liquid curable polymers can be sorbed by an already crosslinked polymeric structure and then cured so as to produce the desired entanglement. The particular curing conditions in any given instance are determined by the type of polymer that is to be crosslinked.

Test Procedures

After the IPN films are cast and cured, they are tested to determine the physical properties of the IPN as compared to the crosslinked parent polymers. The swelling of the IPN's is also determined. The swelling ratio, q, is defined as the ratio of the volume of the swollen film to that of the unswollen film obtained in chloroform and toluene. A sample of each film, approximately one inch square and five mils in thickness, is weighed and then placed in the solvent in covered petri dishes at room temperature. They are removed after 24 hours, blotted dry with absorbent tissue as carefully and quickly as possible, and then reweighed. The swelling ratios are calculated using the known densities of the solvents and the densities of the polymers. To insure swelling to equilibrium has occurred, the films are replaced in the solvent, allowed to swell for another 24 hours, and reweighed.

The apparent densities of the films are measured by weighing strips of film taken from the center of the originally cast membranes to insure the uniformity of measured volume.

The stress-strain properties are measured on an Instrom Tensile Tester Model TTD at 22° C. The tests are run at a crosshead speed of 20 in/min.

The crosslink densities, $C_S$, or moles of effective crosslink per cubic centimeter are determined for several networks by the swelling method of Cluff, Gladding, and Pariser (J. Polymer Sci. 45, 341 [1960]). The formulated emulsions containing curing agents and stabilizers are lyophilized as follows: approximately 125 g. of emulsion are poured into a 500 ml. egg-shaped round bottom flask with a male ground glass joint. The emulsion is frozen in a dry ice-acetone bath with the flask rotated at an angle to obtain as much surface area as possible. The ice was then sublimed off under a vacuum of $10^{-2}$ mm of Hg on a standard lyophilizer. The resulting polymers are, in general, coarse rubbery powders. It is necessary to use this method rather than one of the more conventional coagulation techniques in order to insure uniformity in the cases of the latex combinations, since all latices do not coagulate at equal rates or under the same conditions. Cylindrical pellets, 0.75 inch in diameter and approximately 0.5 inch high, are then made by compression molding the solid polymer on a Carver press at 140° C. and 5000 pounds total force for fifteen minutes, thus curing the materials at the same time. The pellets are then swollen to equilibrium in toluene. This requires about four days. The compression stress-strain curves are then obtained on an Instron Tensile Tester Model TTD at 22° C. The crosslink density is given by $$C_S = \frac{2}{3} \frac{h_o S}{3 A_o RT}$$

where $A_o$ is the cross sectional area and $h_o$ the height of the unswollen, undeformed pellet, R the gas constant, T the absolute temperature, and S the slope of the stress-strain curve obtained directly from the Instron charts.

In the IPN's shown in EXAMPLES, infra, swelling characteristics were observed to approach those of the more readily swellable network, while for those cases where the product is not an IPN, such is not the case.

The stress-strain data indicate that the tensile strength of the combinations is intermediate between that of the constituent networks, and is in most cases lower than the arithmetic mean, contrary to what was expected.

The crosslink density of all IPN's was observed to be greater than the arithmetic mean of the sum of the crosslink densities of the parent networks thus indicating that some interpenetration has occurred. Possibly total interpenetration has not occurred in all instances and more than one phase may exist in such networks.

| Designation | STARTING MATERIALS | |
|---|---|---|
| | Material | Supplier |
| U-1033 | Urethane latex. A 50% water emulsion of crosslinked polymer based on TDI and a blend of poly(oxypropylene) glycols and triols, chain extended with a diamine. | Wyandotte Chemicals Corporation |
| Hycar 2600 × 120 (H-120) | A 50% water emulsion of polyacrylate. | B. F. Goodrich Chemical Co. |
| Hycar 2600 × 138 (H-138) | A 50% water emulsion of polyacrylate. | B. F. Goodrich Chemical Co. |
| N | Poly(2-chloro-1,3-butadiene) i.e., Polychloroprene latex. A 50% water emulsion. | E. I. duPont de Nemours & Co. |
| SBR-5362 | Poly(styrene-butadiene). An 8% water emulsion of linear random copolymer of styrene and butadiene. | Goodyear Chemical Company |
| SBR-880 | Poly(styrene-butadiene). A 48% water emulsion of a linear copolymer of styrene | Dow Chemical Company |

-continued

STARTING MATERIALS

| Designation | Material | Supplier |
|---|---|---|
| | and butadiene in a 52:45 ratio plus 6 parts of carboxylic acid present as acrylic. | |
| S | Poly(dimethylsiloxane) latex. A 22.40% water emulsion of hydroxyl-terminated poly(dimethylsiloxane) containing a small amount of methyl siloxane units. | Dow Corning Corporation |
| U-E-503 | A 50% emulsion of crosslinked poly(urethaneurea) made by emulsion polymerization. | |
| Pluracol P-2010 P-1010 | Polypropylene glycols. | Wyandotte Chemicals Corp. |
| Pluracol TP-440 | Polyoxypropylene adduct of trimethylol propane triol (urethane grade). | Wyandotte Chemicals Corporation |
| Pluracol Pep-450 | Polyoxypropylene derivative of pentaerythritol. | Wyandotte Chemicals Corp. |
| Pluracol SP-760 | Polyoxypropylene derivative of sorbitol. | Wyandotte Chemicals Corp. |
| Polymeg 2000 1000 600 | Polytetra-methylene ether glycols. | Quaker Oats Company |
| TDI (Tolylene diisocyanate) | 80/20 mixture of 2,4- and 2,6-isomers of tolylene diisocyanate | Wyandotte Chemicals Corporation |
| Styrene Monomer | | Dow Chemical Co. |
| Polyester P.I.-1 (flexible) | Maleic anhydride adipic acid, diethylene glycol, dipropylene glycol. | |
| Polyester P-373 (rigid) | Unsaturated polyester containing maleic and phthalic anhydride. | Woodall Industries |
| Epon 828 | Bisphenol A-epichlorohydrin adduct, epoxy No. 84. | Shell Chemical |
| Epon 152, 154 | Novolac-epichlorohydrin adducts, epoxy No. 175. | Shell Chemical |
| ERL 4289 | Epoxy resin (cycloaliphatic). | Union Carbide |
| Ethyl acrylate (monomer) | | Rohm & Haas Co. |
| Copolymer of Ethyl Acrylate and Methyl Methacrylate | | |
| Elastonol JX-2057 | Hydroxyl-terminated polyester of 1,4-butane diol and adipic acid (OH) No. 55.1 Acid No. 0.02 | Intercontinental Urethanes, Inc. |
| Ethylene glycol dimethacrylate | | Sartomer Resins, Inc. |
| Benzoyl Peroxide | | Lucidol Division |
| Lauroyl Peroxide | | Lucidol Division |
| DMP-30 | 2,4,6-tris(dimethylaminomethyl)phenol | Rohm & Haas Co. |
| Catalyst T-9 | Stannous octoate | M & T Chemicals, Inc. |

The following Examples further illustrate the present invention:

EXAMPLE 1

Macrocyclic structures of polyacrylate and poly(urethane-urea)

H-138, a polyacrylate latex, having a pH of 5, 50 percent total solids, Brookfield Viscosity at 60 RPM with Spindle No. 2 of 153 centipoises, and a glass transition temperature of 20° C., was formed as follows: to 200 g. of an emulsion containing 50% by weight linear polymer were added 1.1 g. of a 68% by weight water dispersion of sulfur, 5 g. of a 60% by weight water dispersion of zinc oxide, and 2 g. of a 50% by weight water dispersion of butylated bisphenol A. The mixture was vigorously stirred for one hour and films cast on glass, using a doctor blade, after the stirred-in air bubbles had disappeared. The films were curved at 120° C. for 30 minutes thus crosslinking the H-138 polymer by the usual vulcanization mechanism in which sulfur and zinc oxide form the crosslinks; zinc dibutyldithiocarbamate is an accelerator, and the butylated bisphenol A an antioxidant added to prevent degradation during cure.

Urethane latex, U-1033, a poly(urethane-urea), was formed as follows: a 50% by weight water emulsion of crosslinked poly(urethane-urea) was made by an emulsion polymerization of a prepolymer derived from tolylene diisocyanate and a blend of poly(oxypropylene) glycol and triol and chain extended with a diamine. No extraneous crosslinking agents were necessary because this polymer is self-crosslinking due to the presence of triols. Films were cast and cured as above.

IPN was formed as follows: equal weights of the two emulsions were combined and vigorously agitated for one hour to yield a homogeneous mixture. Films were cast and cured as above.

35% higher than that of H-138, the more highly crosslinked of the separate networks, indicating quite extensive interpenetration. The separation of the two networks by the acid hydrolysis of the polyurethane fraction demonstrates that there is little or no interaction between the two polymers. Thus an IPN has been produced.

TABLE I

| Network | Tensile at break (PSI) | Elongation (%) | Tan $\delta$ | E (dynes/cm$^2$) $\times 10^{-9}$ | q (%) Chloroform | q (%) Toluene | Apparent density (g/cc) | $C_S$ (moles/cc) $\times 10^4$ |
|---|---|---|---|---|---|---|---|---|
| U-1033 | 2400 | 422 | — | .14 | 644 | 275 | 1.133 | .350 |
| H-138 | 1060 | 93 | .071 | 19 | 429 | 156 | 1.167 | .385 |
| IPN | 2370 | 273 | .10 | 6.2 | 542 | 235 | 1.142 | .519 |
| Extracted IPN | — | — | — | — | — | — | .780 | — |

VISCOELASTIC PROPERTIES

The stress-strain properties of the cast films were measured on an Instron Tensile Tester at 22° C. The results are shown in Table I. The dynamic modulus E and tan $\delta$ were obtained using a Vibron direct reading dynamic viscoelastometer at a frequency of 110 cps. The results are shown in Table I.

SWELLING OF THE NETWORKS

The swelling ratio q, defined as the ratio of the volume of the swollen film to the volume of unswollen film, was obtained in chloroform and toluene. The results are also given in Table I.

APPARENT DENSITY

The density of the films are obtained by weighing strips of film of measured volume.

CROSSLINK DENSITY

The crosslink densities $C_S$, or moles of effective crosslinks per cubic centimeter, were determined by the swelling method of Cluff, Gladding, and R. Pariser, J. Polym. Sci. 45, 341 (1960), in which the compression moduli of cylindrical pellets of polymer swollen in solvent are obtained. The results are shown in Table I.

SEPARATION AND INFRARED ANALYSIS

Infrared (R) spectra of the films were taken on a Beckman infrared spectrophotometer. The spectrum of the IPN showed all the bands of the polyacrylate and poly(urethane-urea) networks to be present, with the appearance of no new bands.

The ether portion of the portion of the polyurethane fraction of the IPN was hydrolyzed and the polyurethane subsequently dissolved out by refluxing in 6.13 N HCl for 2½ hours. A 44% weight loss resulted. The IR of the extracted film showed the urethane fraction to be almost completely gone, as evidenced by the disappearance of the amide peak at 3300 cm$^{-1}$, NH peak at 1620 cm$^{-1}$, and ether peak at 1080$^{-1}$. The spectrum of the extracted residue was that of a hydrolyzed polyurethane, and indeed identical to the spectrum of a residue obtained from a solution made by hydrolyzing and dissolving pure U-1033.

A good indication of the formation of IPN is given by the crosslink density. The $C_S$ of the IPN is higher than the arithmetic mean of the separate networks, if any degree of interpenetration has occurred, due to the increase in the number of entanglements caused by superimposing two networks. The $C_S$ of the IPN was

EXAMPLE 2

Macrocyclic structures of polyacrylate and poly(urethane-urea)

Figure 2:
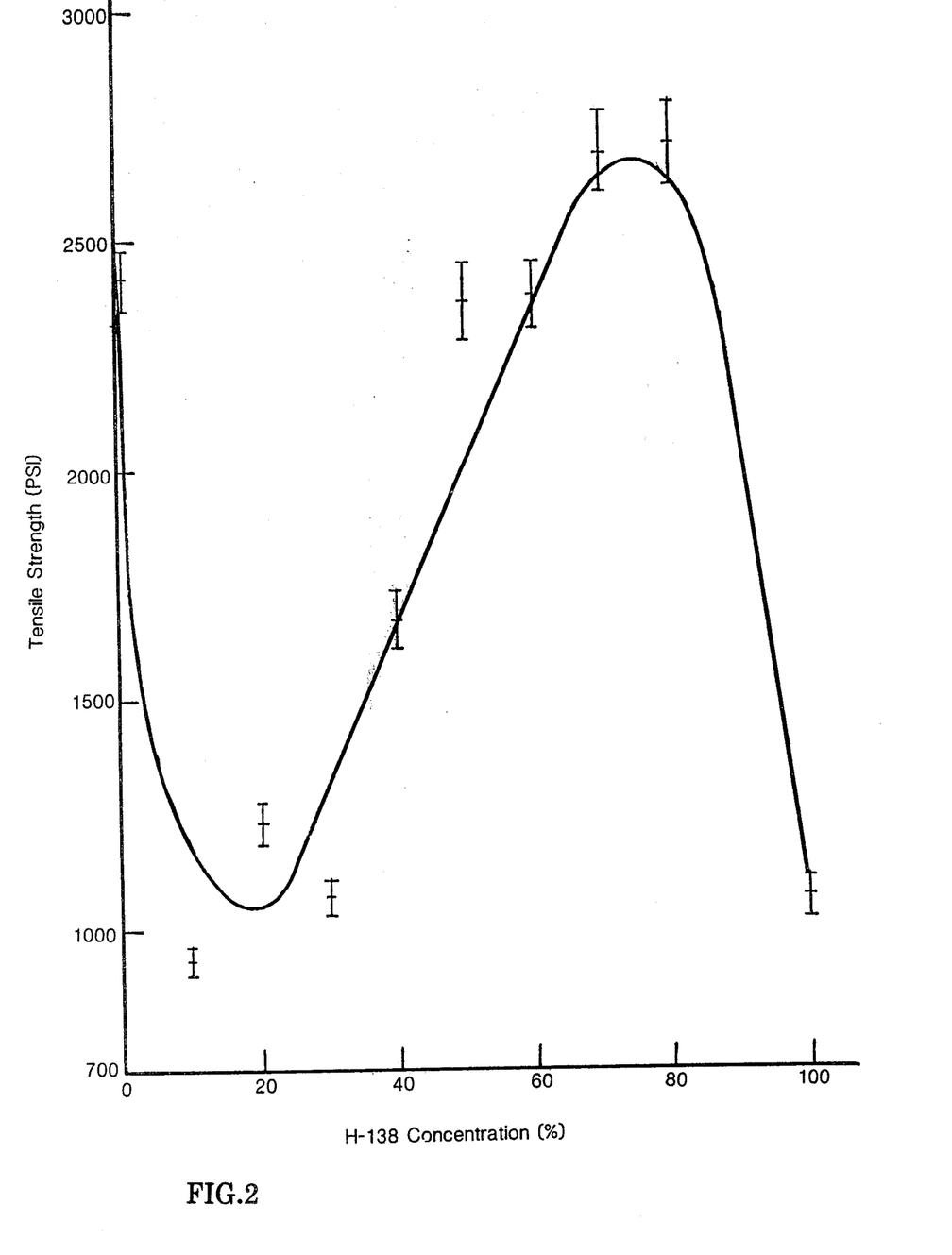
FIG. 2 is a graphical representation of the tensile strength of a polyacrylate-polyurethane IPN containing various amounts of polyacrylate.
Figure 3:
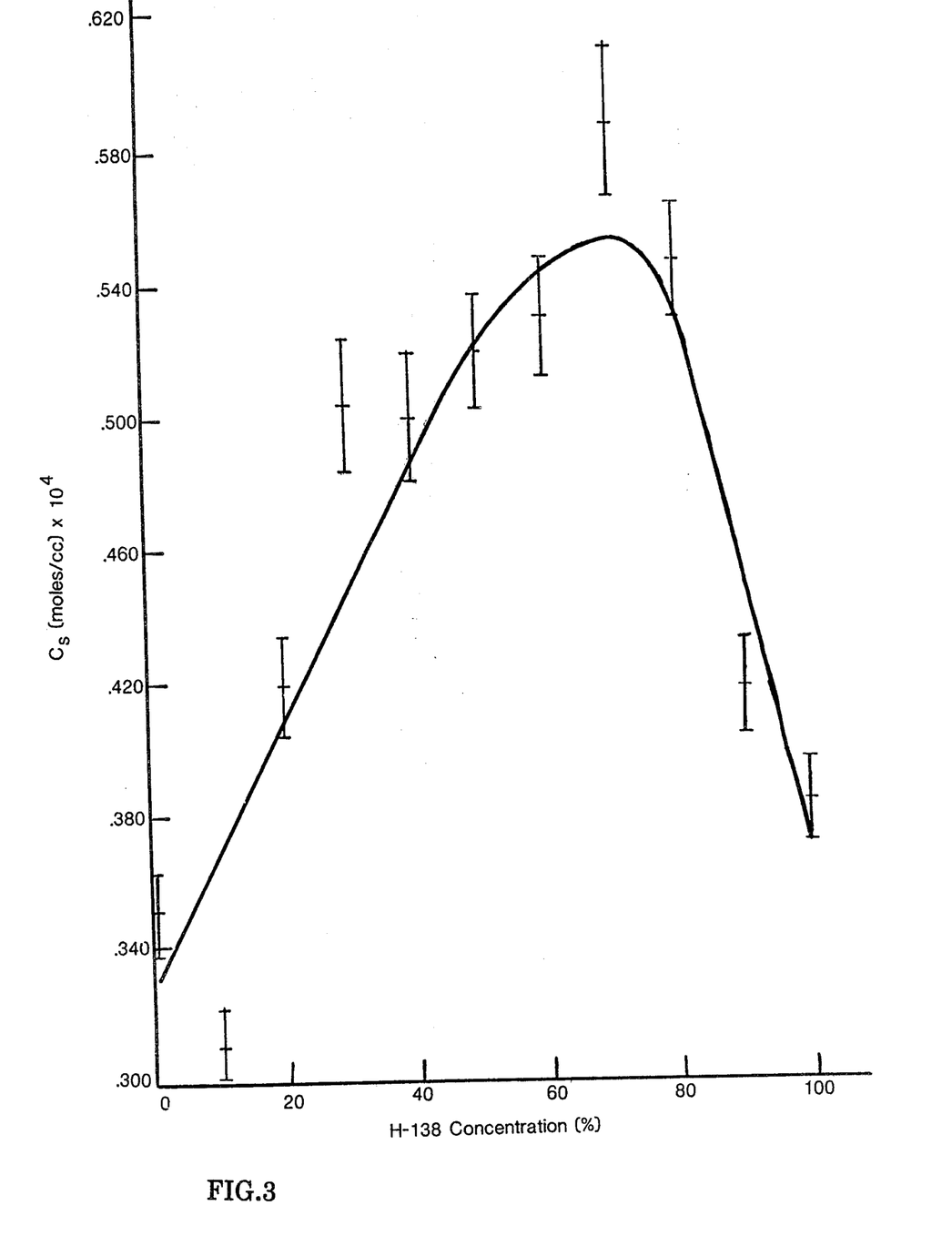
FIG. 3 is a graphical representation of the crosslink density of a polyacrylate-polyurethane IPN with varying amounts of polyacrylate.

Composition with various concentrations of H-138 in the IPN were formed by the procedure in EXAMPLE 1. The tensile strength of the various concentrations of H-138 showed a very interesting and unpredicted behavior as shown in FIG. 2. A minimum in tensile strength was observed at 10% H-138 in the IPN and a maximum at 75% H-138. There is also a maximum in the crosslink density at 70% H-138 as shown in FIG. 3.

The tensile strength of the various concentrations of H-138 in U-1033 in EXAMPLE 2 shows a very interesting and unpredicted behavior. A minimum of tensile strength is observed at 10% H-138 and a maximum at about 75% H-138. This maximum is actually significantly higher than that of pure U-1033.

EXAMPLE 3

Macrocyclic structures of polyacrylate and poly(urethane-urea)

EXAMPLE 1 was repeated employing H-120 in place of H-138 and U-E-503 in place of U-1033. The physical characteristics of the IPN are shown below in Table II and are compared to the arithmetic mean of the properties of the parent networks.

TABLE II

| | Crosslink Density $C_S$(moles/cc) $\times 10^4$ | q % Swelling ratios Chloroform | q % Swelling ratios Toluene | Elong. % | Tensile at break psi |
|---|---|---|---|---|---|
| H-120 | .382 | 925 | 394 | 186 | 147 |
| U-E-503 | .334 | 690 | 395 | 875 | 1417 |
| Mean | .358 | 808 | 395 | 531 | 882 |
| IPN | .392 | 840 | 398 | 438 | 479 |

EXAMPLE 4

Macrocyclic structures of polyacrylate and poly(urethane-urea)

EXAMPLE 1 was repeated using H-120 in place of H-138. The physical properties of the parent networks and the IPN are shown below in Table III.

TABLE III

| | Crosslink Density $C_S$(moles/cc) $\times 10^4$ | q % Swelling ratios Chloroform | q % Swelling ratios Toluene | Elong. % | Tensile at break psi |
|---|---|---|---|---|---|
| H-120 | .382 | 925 | 394 | 186 | 147 |
| U-1033 | .350 | 644 | 244 | 422 | 2412 |
| Mean | .366 | 519 | 319 | 305 | 1280 |
| IPN | .565 | 736 | 324 | 371 | 707 |

EXAMPLE 5

Macrocyclic structures of polychloroprene and poly(urethane-urea)

Polychloroprene latex, N, was formed as follows: to 200 g of a 50% water emulsion of a linear rhodium copolymer of butadiene and acrylonitrile were added 2 g of a 50% water solution of sodium dibutyl dithiocarbamate, 8.3 g of zinc oxide dispersion, and 2 g of butylated bisphenol A dispersion. The mixture was stirred and films cast on glass under a doctor blade, dried for fifteen minutes at room temperature, fifteen minutes at 80° C. and cured for thirty minutes at 120° C. They were removed from the glass plate by immersing in hot, distilled water and carefully stripping from the plate. They were again dried at 80° C. under a vacuum of 2 mm Hg.

U-E-503 films were also cast in a similar manner.

IPN was formed as follows: equal weights of emulsions of N and U-E-503 were combined and vigorously agitated for one hour to yield a homogeneous mixture. Films were cast and cured as above. The physical properties are showed in Table IV.

TABLE IV

| | Crosslink Density $C_S$(moles/cc) $\times 10^4$ | q % Swelling ratios Chloroform | q % Swelling ratios Toluene | Elong. % | Tensile at break psi |
|---|---|---|---|---|---|
| N | .306 | 726 | 450 | 634 | 382 |
| U-E-503 | .334 | 690 | 395 | 875 | 1417 |
| Mean | .320 | 708 | 423 | 755 | 900 |
| IPN | .390 | 694 | 468 | 913 | 593 |

EXAMPLE 6

Macrocyclic structures of polychloroprene and poly(urethane-urea)

EXAMPLE 5 was repeated using U-1033 in place of U-E-503. Table V gives data on the physical properties of the IPN and patent networks.

TABLE V

| | Crosslink Density $C_S$(moles/cc) $\times 10^4$ | q % Swelling ratios Chloroform | q % Swelling ratios Toluene | Elong. % | Tensile at break psi |
|---|---|---|---|---|---|
| N | .306 | 726 | 450 | 634 | 382 |
| U-1033 | .350 | 644 | 244 | 422 | 2412 |
| Mean | .328 | 614 | 347 | 525 | 1400 |
| IPN | .478 | 684 | 390 | 579 | 895 |

EXAMPLE 7

Macrocyclic structures of poly(styrenebutadiene) and poly(urethane-urea)

Polystyrene-butadiene latex, SBR-5362, was formed as follows: to 143 g of an 8% water emulsion of linear random copolymer of styrene and butadiene were added 8.3 g of a 60% water dispersion of zinc oxide, 3.7 g of a 68% water dispersion of sulfur, 3.1 g of a 65% water dispersion of butylated bisphenol A, and 2 g of a 50% by weight water solution of zinc dibutyl dithiocarbamate. The mixture was stirred, films cast, dried, and cured as in EXAMPLE 1.

U-1033 was prepared as in EXAMPLE 1.

IPN was formed as follows: equal weights of the two emulsions were combined and vigorously agitated for one hour to yield a homogeneous mixture. Films were cast and cured as above. The physical properties observed are given in Table VI.

TABLE VI

| | Crosslink Density $C_S$(moles/cc) $\times 10^4$ | q % Swelling ratios Chloroform | q % Swelling ratios Toluene | Elong. % | Tensile at break psi |
|---|---|---|---|---|---|
| SBR-5362 | — | 583 | 500 | 300 | 276 |
| U-1033 | .350 | 644 | 244 | 422 | 2412 |
| Mean | — | 614 | 372 | 360 | 1345 |
| IPN | — | 1480 | 715 | 882 | 270 |

EXAMPLE 8

Macrocyclic structures of poly(styrenebutadiene) and poly(urethane-urea)

EXAMPLE 7 was repeated employing U-E-503 in place of U-1033. The physical characteristics of the IPN are shown below in comparison with arithmetic mean of the properties of the parent networks.

TABLE VII

| | Crosslink Density $C_S$(moles/cc) $\times 10^4$ | q % Swelling Ratios Chloroform | q % Swelling Ratios Toluene | Elong. % | Tensile at break psi |
|---|---|---|---|---|---|
| SBR-5362 | — | 583 | 500 | 300 | 276 |
| U-E-503 | .334 | 690 | 395 | 875 | 1417 |
| Mean | — | 637 | 448 | 588 | 847 |
| IPN | — | 1033 | 822 | 838 | 322 |

EXAMPLE 9

Macrocyclic structures of poly(dimethylsiloxane) and poly(urethane-urea)

Poly(dimethylsiloxane)latex, S, was formed as follows: to 125 g 40% water emulsion of hydroxyl-terminated poly(dimethylsiloxane) containing a small amount of methyl siloxane units was added 25 g of a 20% water emulsion of stannous octoate. Poly(urethane-urea) emulsion, U-E-503 and S were then admixed, the mixture was stirred, films cast, dried and cured as in EXAMPLE 1.

IPN was formed as follows: equal weights of emulsions of S and U-E-503 were combined and vigorously agitated for one hour to yield a homogeneous mixture. Films were cast and cured as in EXAMPLE 1. The physical properties of the parent networks and the IPN are showed below in Table VIII.

TABLE VIII

| | Crosslink Density $C_5$(moles/cc) × $10^4$ | q % Swelling ratios Chloroform | q % Swelling ratios Toluene | Elong. % | Tensile at break psi |
|---|---|---|---|---|---|
| S | — | 316 | 228 | 79 | 131 |
| U-E-503 | .334 | 690 | 395 | 875 | 1417 |
| Mean | — | 503 | 312 | 477 | 774 |
| IPN | — | 576 | 359 | 97 | 206 |

EXAMPLE 10

Macrocyclic structures of poly(dimethylsiloxane) and poly(urethane-urea)

EXAMPLE 9 was repeated using U-1033 in place of U-E-503. Analytical data are summarized in Table IX, below.

TABLE IX

| | Crosslink Density $C_5$(moles/cc) × $10^4$ | q % Swelling ratios Chloroform | q % Swelling ratios Toluene | Elong % | Tensile at break psi |
|---|---|---|---|---|---|
| S | — | 316 | 228 | 79 | 131 |
| U-1033 | .350 | 644 | 244 | 422 | 2412 |
| Mean | — | 480 | 236 | 250 | 1270 |
| IPN | — | 592 | 282 | 255 | 690 |

EXAMPLE 11

Macrocyclic structures of poly(dimethylsiloxane and polyacrylate)

EXAMPLE 9 was repeated employing H-120 in place of U-E-503. Table X gives data on the physical properties of the IPN and the parent networks.

TABLE X

| | Crosslink Density $C_5$(moles/cc) × $10^4$ | q % Swelling ratios Chloroform | q % Swelling ratios Toluene | Elong % | Tensile at break psi |
|---|---|---|---|---|---|
| H-120 | .382 | 925 | 394 | 186 | 147 |
| S | — | 316 | 228 | 79 | 131 |
| Mean | — | 621 | 311 | 133 | 139 |
| IPN | — | 556 | 303 | 279 | 364 |

In the subsequent examples urethane prepolymers were prepared by continuous dropwise mixing of pre-dried 0.84 equivalent of Polymeg 1000 or 1.5 equivalent of Polymeg 600 or 0.7 equivalent of Pluracol 2010, with 1.68 or 3 or 1.4 equivalent of TDI respectively. The mixtures were stirred at 80° C. under $N_2$ atomsphere. After 2 hours the reaction mixture was analyzed for NCO content until the experimental value reached the theoretical concentration of NCO, i.e. NCO/OH=2.

For the polyester (P.I.-1) preparation, 0.2 mole of maleic anhydride, 0.8 mole of adipic acid, 0.2 mole of dipropylene glycol and 0.9 mole of diethylene glycol were mixed together in a three-neck 1000 ml. flask. The reaction mixture at 150° C. was stirred under $N_2$ atmospheres. After 24 hours reaction, the mixture was titrated periodically in pyridine with a standard solution of KOH in order to determine its acid number. A value of less than 25 was achieved.

For urethane casting in a stainless stell rubber mold, Pluracol Pep-450 or Pluracol TP-440 was mixed with the prepolymer at a NCO/OH=1/1 and 0.05 parts of Catalyst T-9 were added. After thorough mixing, the material was cast and cured at 100° C. for 16 hours.

In the case of the polyesters, different proportions of styrene (10%, 20% or 30% of the weight of the polyester) was mixed with the polyester and 1% of the weight of the mixture of benzoyl peroxide was added as the catalyst. After thorough mixing at room temperature, the material was cast between glass plates and subsequently cured overnight at 85° C.

EXAMPLE 12

Macrocyclic structures of (polyesterstyrene) and polyurethane

Polyester P-373 (30% styrene) (40 g) was mixed with 40 g of urethane polymer (Polymeg 600+TDI+Pluracol TP-440, NCO/OH=1); after adding 1% by weight of polyester of benzoyl peroxide and 1% by weight of urethane of Catalyst T-9. After thorough mixing, the mixture was cast between glass plates and cured at 110° C. for 16 hours. The cured sample was opaque, elastomeric, and very tough. The components appeared to be compatible. An IPN was produced.

EXAMPLE 13

Macrocyclic structures of (polyester-styrene) and polyurethane

Polyester P.I.-1 (30% styrene) (40 g) was mixed with 40 g urethane (Polymeg 600+TDI+Pluracol TP-440, NCO/OH=1); afterwards 1% each of benzoyl peroxide and Catalyst T-9 were added. After thorough mixing, the material was cast between glass plates and cured at 110° C. for 46 hours. This material was elastomeric though softer than the material prepared in EXAMPLE 12. After curing, the material was opaque, but not milky. An IPN was formed.

EXAMPLE 14

Macrocyclic structures of (polyesterstyrene) and polyurethane

Polyester P.I.-1 (20% styrene) (40 g.) was mixed with 40 g of urethane (Polymeg 600+TDI+Pluracol TP-440, NCO/OH=1) after adding 1% each of benzoyl peroxide and Catalyst T-9. After thorough mixing the material was cast between glass plates and cured at 110° C. for 16 hours. The results were the same as in EXAMPLE 13.

EXAMPLE 15

Macrocyclic structures of polyurethane and polyepoxide

Urethane (Polymeg 600 or Polymeg 1000+TDI+Pluracol TP-440, NCO/OH=1) (40 g.) was mixed with 40 g. of Epon 828. 0.4 g. of Catalyst T-9 and different amounts of DMP-30 (2, 1, 0.5, and 0.25 g.) were added. After thorough mixing, the materials were cured in aluminum dishes at 110° C. for 16 hours. These samples did not cure well. However, when the concentration of DMP-30 was reduced to 0.2, 0.15 and 0.1 respectively, all samples cured well. The cured materials were elastomeric IPN's.

EXAMPLE 16

Macrocyclic structures of polyurethane and polyepoxide

Urethane (Polymeg 2000+TDI+Pluracol TP-440, NCO/OH-1/1) (40 g.) was mixed with 40 g. of Epon 828. 0.4 g. of Catalyst T-9 and different amounts of DMP-30 were added to the mixture. All samples were cured at 110° C. for 16 hours. The sample containing 0.6 g. of DMP-30 cured well. An IPN was formed. It was rubbery, transparent, and contained some bubbles. The sample containing 0.3 g. of DMP-30 was tacky.

EXAMPLE 17

Macrocyclic structures of polyepoxide and polyurethane

Epon 154 (40 g.) was mixed with 40 g. of urethane (Polymeg 600+TDI+Pluracol TP-440, NCO-/OH=1/1), 0.2 g. of DMP-30 and 0.4 g. of Catalyst T-9 were added. After thorough mixing, the material was cast in an aluminum dish and cured at 110° C. for 16 hours. The material cured well. The material was rubbery and opaque, not tacky and exhibited good strength. An IPN was produced.

EXAMPLE 18

Macrocyclic structures of poly(ethylacrylate) and polyurethane

Poly(ethyl acrylate), prepared from 40 g. ethyl acrylate and polymerized with 0.14 g. lauroyl peroxide for 20 minutes at 65° C., is mixed with 40 g. of urethane (Polymeg 1000+TDI+Pluracol TP-440). One gram of divinyl benzene, benzoyl peroxide and Catalyst T-9 (0.4 g each) are added as catalysts. After thorough mixing, the material is cast in a rubber mold and cured at 90° C. for 12 hours. An elastomeric clear and colorless IPN film is obtained.

EXAMPLE 19

Polyester-polyurethane adduct

Predried Pluracol TP-440 (280 g., 2 equivalents) was mixed dropwise with 348 g. TDI (4 equivalents) and the polyol-TDI mixture was reacted at 80° C. for 2 hours under nitrogen atmosphere and constant stirring. The mixture was titrated periodically until the experimental isocyanate-to-hydroxy ratio reached the theoretical NCO/OH=2. The equivalent weight of the prepolymer was calculated to be 360 from NCO titration. 36 g. (0.1 equivalent) of the above prepolymer was added to 100 g. of Elastonol JX 2057 polyester and to this mixture 272 g. of cellosolve acetate was added. This mixture was reacted at 70° C. for 1 hour under a nitrogen atmosphere and with constant stirring. 20 g. of the final product was mixed with 0.01 g. of Catalyst T-9, the mixture was cast in a rubber mold and allowed to cure at 110° C. for 36 hours. The final product was soft and elastomeric. Strength was low.

EXAMPLE 20

Macrocyclic structures of polyepoxide and polyester-urethane adduct

Polyester-urethane adduct solution in cellosolve acetate (80 g.) as prepared in EXAMPLE 19 was mixed with 0.02 g. of Catalyst T-9 (Component I). Epon 828 (40 g.) was mixed with 0.2 g. of DMP-30 (Component II).

The Components I and II were then mixed together thoroughly. 8 mil films were then drawn on aluminum panels from this blended material. The films were cured at 80° C. for 16 hours in an oven. Very tough, well-cured transparent IPN films were obtained, containing 50 weight percent Epon 828 and 50 weight percent polyester-urethane adduct.

EXAMPLE 21

Macrocyclic structures of polyepoxide and polyester-urethane adduct

Polyester-urethane adduct solution in cellosolve acetate (80 g.) as prepared in EXAMPLE 19 was mixed with 0.02 g. Catalyst T-9 (Component I).

Epon 828 (40 g.) and 0.2 g. of DMP-30 were mixed together thoroughly (Component II). Components I and II were then blended and cast between sealed glass plates and allowed to cure at 110° C. for 16 hours. A transparent elastomeric IPN sheet was obtained, containing 50 weight percent Epon 828:50 weight percent polyester urethane adduct.

EXAMPLE 22

Macrocyclic structures of polyepoxide and polyester-urethane adduct

Polyester-urethane adduct solution in cellosolve acetate (40 g.) was mixed with 0.01 g. of Catalyst T-9 (Component I). Epon 828 (60 g.) was mixed with 0.3 g. of DMP-30 (Component II). Components I and II were mixed thoroughly with further addition of 10 g. of cellosolve acetate to reduce the viscosity. Films were drawn on aluminum plates and were cured at 85° C. for 4 hours. Very tough, well-cured IPN films were obtained. The films had a light yellowish color due to a high percentage (75 weight percent) of Epon 828.

EXAMPLE 23

Macrocyclic structures of polyepoxide and polyester urethane adduct 80 g. of the mixture of Components I and II, as described in EXAMPLE 22, was cast between sealed glass plates and cured for 48 hours at 110° C. A transparent, amber-colored IPN sheet was obtained containing 75 weight percent Epon 828 and 25 weight percent polyester-urethane adduct.

EXAMPLE 24

Macrocyclic structures of polyester-urethane adduct and poly(ethyl acrylate)

The urethane adduct (40 g.) prepared as described in EXAMPLE 19, was mixed with 40 g. of poly(ethyl acrylate) prepared by polymerizing 500 g. of ethyl acrylate with 1.25 g. lauroyl peroxide under a nitrogen atmosphere at 60° C. for 20 minutes. Catalyst T-9 (0.4 g.), benzoyl peroxide (0.4 g.), ethylene glycol dimethacrylate (4 g.) and cellosolve acetate (20 g.) were then added to the above mixture. After thorough mixing, the material was cast between glass plates and cured at 110° C. for 16 hours. The product was transparent, elastomeric IPN and appeared to possess good strength properties.

EXAMPLE 25

Macrocyclic structures of polyepoxide and poly(ethyl acrylate)

Epon 828 (40 g.) was mixed with 0.4 g of DMP-30 (Component I).

36 g. of poly(ethyl acrylate) as prepared in EXAMPLE 24 was mixed with 3.6 g. of ethylene glycol dimethacrylate and 0.4 g. of benzoyl peroxide. (Component II).

Components I and II were then mixed thoroughly and cured between sealed glass plates at 110° C. for 16 hours. The cured material was a transparent, elastomeric IPN and had good strength properties.

EXAMPLE 26

Macrocyclic structures of styrene and polyurethane

To 36 g. of styrene monomer were added 3.6 g. of ethylene glycol dimethacrylate and 0.04 g. of benzoyl peroxide (Component I). 36 g. of the urethane prepolymer (prepolymer of Polymeg 1000+TDI, NCO/OH=2/1), described above, was mixed with 3.75 g. of Pluralcol Pep-450 and 0.02 g. of Catalyst T-9 (Component II).

Components I and II were mixed thoroughly and cured between sealed glass plates at 110° C. for 48 hours. The product looked cloudy but had strength. An IPN was produced.

EXAMPLE 27

Macrocyclic structures of polyesterstyrene adduct and polyepoxide

Polyester P-373 (30% styrene) (60 g.) was mixed with 20 g. of Epon 828. Benzoyl peroxide (0.6 g.) and 0.4 g. of DMP-30 were added. After thorough mixing the material was cast between glass plates and cured at 110° C. for 48 hours. The resulting product seemed to have good adhesive properties as it could not be removed from the glass plates. The material was transparent and appeared to possess good strength properties. An IPN was formed.

EXAMPLE 28

Preparation of a Polyester

The reaction mixture contained 5.6 moles of adipic acid, 2.2 moles of maleic anhydride, 6.3 moles of diethylene glycol, and 1.4 moles of dipropylene glycol. After stirring for about 15 minutes, the mixture was slowly heated to 150° C., the reaction was carried out in a nitrogen atmosphere. Reduced pressure and suction were used to remove the water formed as the reaction proceeded. After heating for a while, para-toluene sulfonamide was added to catalyze the reaction. To remove the final traces of water, the temperature was raised to 175° C.

When the hydroxyl number reached zero, isopropyl alcohol was added to "cap" the open carboxyl groups remaining along the chain. The excess alcohol and water were removed when the acid became zero. The final product was essentially a neutral polyester, diethylene-dipropylene glycol adipate-maleate.

EXAMPLE 29

Macrocyclic structures of polyesterstyrene adduct and polyurethane

The mixture of 48 g. of polyester prepared as in EXAMPLE 28 (0.029 equivalent), 16 g. of styrene (0.5 equivalent), 16 g. of urethane prepolymer made from Polymeg 1000 and TDI (NCO/OH=2/1) (0.017 equivalent), and 1.7 g. Pluracol Pep-450 (0.017 equivalent) were reacted with 1% Catalyst T-9 and benzoyl peroxide in a closed mold at 110° C. overnight. After 48 hours, the resultant polymer was a translucent, flexible, but relatively weak elastomer. An IPN was formed.

EXAMPLE 30

Formation of an IPN

Poly(ethyl acrylate) is prepared by polymerizing ethyl acrylate (40 g.) in the presence of lauroyl peroxide (0.14 g.) for 20 minutes at 65° C. The resulting polymer is then admixed with ethylene glycol dimethacrylate (1 g.), cast between sealed glass plates, and cured at 90° C. for 16 hours. A crosslinked, rigid, transparent sheet is obtained.

A cellosolve acetate solution of a polyester-urethane adduct is prepared in a manner similar to EXAMPLE 19 and admixed with stannous octoate catalyst. A portion of the produced poly(ethyl acrylate) sheet is then immersed in the cellosolve acetate solution and the adduct, together with the catalyst, swollen in. Thereafter the poly(ethyl acrylate) sheet is cured at about 80° C. for about 16 hours. A poly(ethyl acrylate) and polyester-urethane adduct interpenetrating polymeric network is formed.

EXAMPLE 31

Acrylate-Polyurethane IPN

A copolymer of ethyl acrylate and methyl methacrylate is prepared by polymerizing the acrylates in a 2:1 weight ratio (40 g.) in the presence of lauroyl peroxide (0.14 g.) for 20 minutes at 65° C. The produced copolymer is then dissolved in cellosolve acetate along with an equal amount by weight of a polyurethane prepolymer composed of polytetramethylene glycol and tolylene diisocyanate in a 2:1 NCO/OH ratio. To the resulting solution is then added ethylene glycol dimethacrylate (5% by weight of the acrylic copolymer) and also a 50:50 equivalent weight mixture of 1,4-butane diol plus trimethylol propane, in an equivalent amount to the terminal NCO groups present in the polyurethane prepolymer, and also about 0.02 weight percent stannous octoate.

The obtained admixture is then cast and cured between glass plates at 80° C. for two hours and then at 100° C. for 16 hours. A clear, colorless IPN of polyacrylate and polyurethane is obtained having a tensile strength of about 2600 psi and an elongation of about 380%. The obtained IPN exhibits a higher tensile strength as well as a higher thermal resistance, as measured by thermal gravimetric analysis, then either of the two starting components.

EXAMPLE 32

Polyacrylate-Poly(urethane-urea) IPN

A polyacrylate latex consisting of ethyl acrylate, methyl methacrylate, and ethylene glycol dimethacrylate and having a 50% by weight solids content is formed as follows: to 200 g. of an emulsion containing 50% by weight of linear polymers is added 1.1 g. of a 68% by weight water dispersion of sulfur, 5 g. of a 60% by weight water dispersion of zinc oxide, and 2 g. of a 50% by weight water dispersion of butylated bisphenol A.

A urethane latex is formed as follows: a 50% by weight water emulsion of crosslinked poly(urethane-urea) is prepared by polymerizing a prepolymer derived from tolylene diisocyanate and a blend of poly(oxypropylene) glycol and triol and chain extended with a diamine. No extraneous cross-linking agents are necessary because this polymer is self-crosslinking because of the triols that are present.

An IPN is formed as follows: equal weights of the foregoing two emulsions are combined and vigorously agitated for about one hour to yield a homogeneous mixture. Films are cast and cured at 120° C. for 30 minutes. The tensile strength of the obtained IPN is greater than that of either starting component.

We claim:

1. A synthetic resin having a topologically interpenetrating polymeric network characterized by a single glass transition temperature comprising at least two separate chemically dissimilar macrocyclic structures of crosslinked polymer chains which do not contain ionizable groups and which are crosslinked by different crosslinking agents which crosslink by different crosslinking mechanisms, the polymer chains of one macrocyclic structure being threaded through, but having substantially no intermolecular chemical bonding with, another macrocyclic structure of the interpenetrating polymeric network, with the proviso that the macrocyclic structures have rings of at least 20 ring atoms.

2. The synthetic resin in accordance with claim 1 wherein one macrocyclic structure comprises crosslinked poly(urethaneurea) chains and another macrocyclic structure comprises crosslinked polyacrylate chains.

3. The synthetic resin in accordance with claim 1 wherein one macrocyclic structure comprises crosslinked polychloroprene chains and another macrocyclic structure comprises crosslinked poly(urethane-urea) chains.

4. The synthetic resin in accordance with claim 1 wherein one macrocyclic structure comprises crosslinked poly(styrenebutadiene) chains and another macrocyclic structure comprises crosslinked poly(urethane-urea) chains.

5. The synthetic resin in accordance with claim 1 wherein one macrocyclic structure comprises crosslinked poly(dimethylsiloxane) chains and another macrocyclic structure comprises poly(urethane-urea) chains.

6. The synthetic resin in accordance with claim 1 wherein one macrocyclic structure comprises crosslinked poly(dimethylsiloxane) chains and another macrocyclic structure comprises polyacrylate chains.

7. The synthetic resin in accordance with claim 1 wherein one macrocyclic structure comprises crosslinked polyesterstyrene chains and another macrocyclic structure comprises polyurethane chains.

8. The synthetic resin in accordance with claim 1 wherein one macrocyclic structure comprises crosslinked polyurethane chains and another macrocyclic structure comprises crosslinked polyepoxide chains.

9. The synthetic resin in accordance with claim 1 wherein one macrocyclic structure comprises crosslinked poly(ethyl acrylate) chains and another macrocyclic structure comprises crosslinked polyurethane chains.

10. The synthetic resin in accordance with claim 1 wherein one macrocyclic structure comprises crosslinked copolymers of ethyl acrylate with methyl methacrylate and another macrocyclic structure comprises crosslinked polyurethane chains.

11. The synthetic resin in accordance with claim 1 wherein one macrocyclic structure comprises crosslinked polyepoxide chains and another macrocyclic structure comprises crosslinked polyester-urethane adduct chains.

12. The synthetic resin in accordance with claim 1 wherein one macrocyclic structure comprises crosslinked polyesterurethane adduct chains and another macrocyclic structure comprises crosslinked poly(ethyl acrylate) chains.

13. The synthetic resin in accordance with claim 1 wherein one macrocyclic structure comprises crosslinked polyepoxide chains and another macrocyclic structure comprises crosslinked poly(ethyl acrylate) chains.

14. The synthetic resin in accordance with claim 1 wherein one macrocyclic structure comprises crosslinked styrene chains and another macrocyclic structure comprises crosslinked polyurethane chains.

15. The synthetic resin in accordance with claim 1 wherein one macrocyclic structure comprises crosslinked polyesterstyrene adduct chains and another macrocyclic structure comprises crosslinked polyepoxide chains.

16. The synthetic resin in accordance with claim 1 wherein one macrocyclic structure comprises crosslinked polyesterstyrene adduct chains and another macrocyclic structure comprises crosslinked polyurethane chains.

17. The synthetic resin in accordance with claim 1 wherein one macrocyclic structure comprises crosslinked polyurethane chains.

18. A method for the production of synthetic resin of two or more polymers having an interpenetrating polymeric network of polymeric chains characterized by a single glass transition temperature which comprises providing at least two types of chemically dissimilar polymers which do not contain ionizable groups and which are crosslinkable by different crosslinking mechanisms using polymer specific crosslinking agents, forming an intimate admixture of said types of chemically dissimilar polymers, and simultaneously crosslinking with polymer specific crosslinking agents polymers of the same type to each other while in intimate admixture, thereby producing separate macrocyclic structures of said chemically dissimilar polymers having substantially no intermolecular chemical bonding therebetween but being threaded through each other in an interpenetrating polymeric network.

19. The method in accordance with claim 14 wherein emulsions of said types of polymers are admixed.

20. A method for the production of a synthetic resin of two or more polymers having an interpenetrating network of polymeric chains which comprises providing a macrocyclic structure of crosslinked polymer containing no ionizable groups, sorbing within the macrocyclic structure of the crosslinked polymer, a liquid, crosslinkable polymer which contains no ionizable groups and which is chemically dissimilar to said macrocyclic crosslinked polymer and does not chemically inter-react therewith, and thereafter crosslinking the sorbed polymer in situ with a polymer specific crosslinking agent.

21. A method for the production of synthetic resin of two or more polymers having an interpenetrating polymeric network of polymeric chains characterized by a single glass transition temperature which comprises providing at least two types of chemically dissimilar polymers which do not contain ionizable groups and which are crosslinkable by different crosslinking mechanisms using polymer specific crosslinking agents, forming an intimate admixture of said types of chemically dissimilar polymers, and crosslinking with polymer specific crosslinking agents polymers of the same type to each other, at least one of which is crosslinked while in intimate admixture with the other, thereby producing separate macrocyclic structures of said chemically dissimilar polymers having substantially no intermolecular chemical bonding therebetween but being threaded through each other in an interpenetrating polymeric network.

* * * * *

UNITED STATES PATENT AND TRADEMARK OFFICE
CERTIFICATE OF CORRECTION

PATENT NO. : 4,302,553

DATED : November 24, 1981

INVENTOR(S) : Harry L. Frisch, Kurt C. Frisch and Daniel Klempner

It is certified that error appears in the above—identified patent and that said Letters Patent is hereby corrected as shown below:

The Title page should be deleted to appear as per attached Title page.

United States Patent [19]

Frisch et al.

[11] 4,302,553
[45] Nov. 24, 1981

[54] INTERPENETRATING POLYMERIC NETWORKS

[75] Inventors: Harry L. Frisch, 132 Mosher Rd., Delmar, N.Y. 12054; Kurt C. Frisch, 17986 Parke La., Grosse Ile, Mich. 48138; Daniel Klempner, 29340 Dequindre Rd., Apt. 204, Warren, Mich. 48221

[73] Assignees: Harry L. Frisch, Delmar, N.Y.; Kurt C. Frisch, Grosse Ile; Daniel Klempner, Warren, both of Mich.

[21] Appl. No.: 303,272

[22] Filed: Nov. 2, 1972

Related U.S. Application Data

[63] Continuation-in-part of Ser. No. 85,362, Oct. 30, 1970, abandoned.

[51] Int. Cl.³ .................. C08L 33/08; C08L 75/12
[52] U.S. Cl. .................. 525/28; 525/31; 525/100; 525/107; 525/127; 525/128; 525/129; 525/130; 525/438; 525/440; 525/453; 525/454; 525/455; 525/459; 525/903
[58] Field of Search ............... 260/824, 859 R, 830 P, 260/858; 525/28, 31, 100, 107, 127, 128, 129, 130, 438, 454, 459, 903

[56] References Cited

U.S. PATENT DOCUMENTS

| | | | |
|---|---|---|---|
| 3,316,324 | 4/1967 | Mendoyanis | 260/830S |
| 3,351,517 | 11/1967 | Willis | 260/889 |
| 3,657,379 | 4/1972 | Hilbelink et al. | 260/824 R |
| 3,700,752 | 10/1972 | Hutchinson | 260/859 R |

FOREIGN PATENT DOCUMENTS 728508 4/1955 United Kingdom .

OTHER PUBLICATIONS

Millar, *J. Chem. Soc.* (London), 1311-1317 (1960).
*The Vanderbilt Rubber Handbook*, Winspear, G. G., "Vulcanization" R. T. Vanderbilt Co. Inc., N. Y. (1958) pp. 366, 367, 372 & 373.

*Primary Examiner*—Wilbert J. Briggs, Sr.
*Attorney, Agent, or Firm*—Gordon W. Hueschen

[57] ABSTRACT

Synthetic resins having a topologically interpenetrating polymeric network comprise macrocyclic structures of chemically different, crosslinking polymers which are permanently entangled with each other. The several macrocyclic structures that are present are characterized by the absence of chemical bonds between the individual networks.

21 Claims, 3 Drawing Figures

UNITED STATES PATENT AND TRADEMARK OFFICE
CERTIFICATE OF CORRECTION

PATENT NO. : 4,302,553
DATED : November 24, 1981
INVENTOR(S) : Harry L. Frisch, Kurt C. Frisch and Daniel Klempner It is certified that error appears in the above—identified patent and that said Letters Patent is hereby corrected as shown below:

Col. 7, line 51; delete "portion of the" (second occurrence)
Col. 9, line 16; "rhodium" should read -- random --
Col. 9, line 21; "under" should read -- using --
Col. 9, line 51; "patent" should read -- parent --
Col. 11, line 53; "atomsphere" should read -- atmosphere --
Col. 11, line 61 & 62; "atmospheres" should read -- atmosphere --

Col. 15, line 14; "Pluralcol" should read -- Pluracol --

Col. 18, line 47 (Claim 19, line 1); "claim 14" should read -- claim 18 --

Signed and Sealed this

Fifteenth Day of June 1982

[SEAL]

Attest:

GERALD J. MOSSINGHOFF

Attesting Officer

Commissioner of Patents and Trademarks